United States Patent [19]

Newman

[11] 4,355,066
[45] Oct. 19, 1982

[54] SPOT-BONDED ABSORBENT COMPOSITE TOWEL MATERIAL HAVING 60% OR MORE OF THE SURFACE AREA UNBONDED

[75] Inventor: Nicholas S. Newman, Cohasset, Mass.

[73] Assignee: The Kendall Company, Walpole, Mass.

[21] Appl. No.: 213,820

[22] Filed: Dec. 8, 1980

[51] Int. Cl.³ .......................... B32B 5/26; B32B 7/14; B32B 23/08; B32B 23/10
[52] U.S. Cl. ................................ 428/198; 15/209 R; 128/296; 428/138; 428/247; 428/286; 428/288; 428/339; 428/903
[58] Field of Search ............... 428/138, 198, 286, 903, 428/247, 288, 339; 15/209 R

[56] References Cited

U.S. PATENT DOCUMENTS

| | | | |
|---|---|---|---|
| 4,041,203 | 8/1977 | Brock et al. | 428/903 |
| 4,196,245 | 4/1980 | Kitson et al. | 428/198 |
| 4,211,227 | 7/1980 | Anderson et al. | 428/198 |
| 4,239,792 | 12/1980 | Ludwa | 428/198 |
| 4,276,338 | 6/1981 | Ludwa et al. | 428/138 |
| 4,287,251 | 9/1981 | King et al. | 428/198 |
| 4,298,649 | 11/1981 | Meitner | 428/198 |
| 4,302,495 | 11/1981 | Marra | 428/198 |

Primary Examiner—James C. Cannon

[57] ABSTRACT

An absorbent hydrophilic and oleophilic multipurpose composite towel material having an inner absorbent layer of cellulosic material and outer layers of microfibrous polyolefin material on opposite sides of the inner layer, the outer layers being spot fusion bonded through the inner layer to produce a towel having exceptionally high void volume for improved absorbency.

6 Claims, 4 Drawing Figures

SPOT-BONDED ABSORBENT COMPOSITE TOWEL MATERIAL HAVING 60% OR MORE OF THE SURFACE AREA UNBONDED

This invention relates to an absorbent hydrophilic and oleophilic multipurpose composite towel material and its method of manufacture.

Non-woven materials have long been used as disposable towels in a wide variety of applications. For example, such towels may be used as shop towels for wiping oil and grease from machine parts as well as for drying wet hands. They may also be used in the graphic arts trade for cleaning ink and solvents from printing elements. Another use is as hospital towels, which require high water absorbency and also alcohol absorbency. A further common use is as kitchen towels, which require oil and grease absorbency, as well as high water absorbency.

The functional requirements of such a towel are primarily rapid absorbency and the ability to hold and retain both aqueous liquids, such as water, and oleaginous liquids, such as oils, solvents and greases, even when gently squeezed; high abrasion resistance to provide a lint-free surface even after repeated use; and adequate wet and dry strength in order to maintain its integrity in use, so that, for example, it can repeatedly be pulled out of a pocket. In addition, it is highly desirable that such a towel have a soft, textile-like hand.

Accordingly, it is a major object of the present invention to provide a novel absorbent hydrophilic and oleophilic multipurpose composite towel material having exceptionally high void volume for improved absorbency and one which also meets all of the above mentioned requirements.

This has been accomplished, according to the present invention, by providing a novel absorbent hydrophilic and oleophilic multipurpose composite towel material having an inner absorbent layer of cellulosic material and outer layers of microfibrous polyolefin material on opposite sides of the inner layer. It is a particularly important feature of the novel towel material of the invention that the bonding together of the outer layers occurs in the form of spot fusion bonding through the inner layer. By so doing, utilizing the methods of the invention, it is possible to eliminate a substantial proportion of the absorption-reducing bonded portions of heretofore known composite towels and so produce a towel material having both low density and exceptionally high void volume for greatly increased absorbency, both of aqueous and oleaginous liquids.

Further objects and advantages of the present invention will be apparent from the following detailed description of preferred embodiments of the invention, together with the accompanying drawings, wherein.

Figure 1:
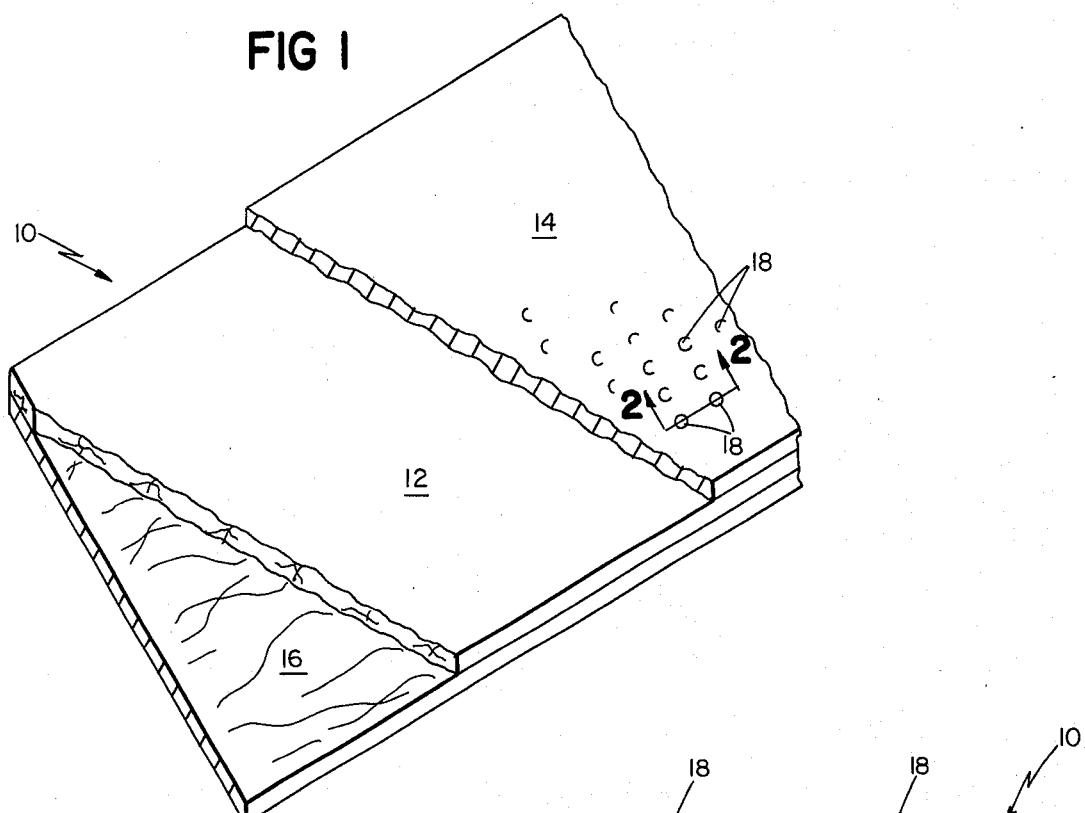
FIG. 1 is a perspective view, with portions broken away, of the novel absorbent hydrophilic and oleophilic multipurpose composite towel material of the present invention.
Figure 2:
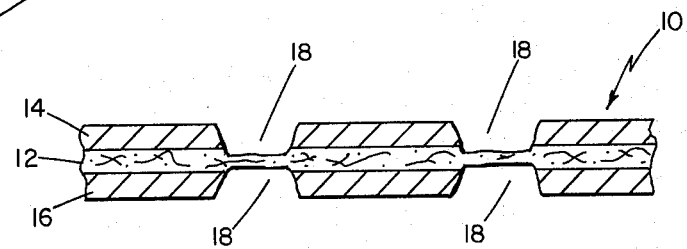
FIG. 2 is a sectional view taken along line 2—2 of FIG. 1.

Referring to FIGS. 1 and 2, in general, the novel absorbent hydrophilic and oleophilic multipurpose composite towel material 10 of the invention has an inner absorbent layer 12 of cellulosic material and outer layers 14 and 16 of microfibrous polyolefin material on opposite sides of inner layer 12, with the three layers being spot fusion bonded together at discrete bonding areas 18 through inner layer 12 to provide maximum void volume. The hydrophobic nature of the fibers of outer layers 14 and 16 provides a composite towel material which tends to retain absorbed water within the absorbent inner layer 12 and so provide a dryer outer surface.

Figure 3:
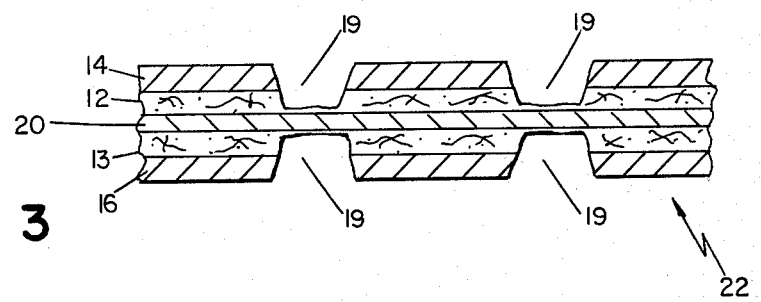
FIG. 3 is a sectional view of a modification of the composite towel material of FIGS. 1 and 2.

In FIG. 3 is shown a modification of the absorbent hydrophilic and oleophilic multipurpose composite towel material of FIGS. 1 and 2, wherein a reinforcing layer 20 may be incorporated between two inner absorbent layers 12 and 13 and similarly bonded at areas 19 to provide a composite towel material 22 of increased strength.

Outer layers 14 and 16 are of synthetic amorphous microfibers, such as are described in U.S. Pat. No. 3,978,185, of about 2 to 20 and, preferably, about 2 to 4 micron diameter and 2 to 4 inch length. Commercial polypropylene melt blown fibers, available from Riegel Products, Milford, N.J. as #PP-0241 weighing 36 grams/square yard and #PP-02159, weighing 12 grams/square yard, have been found to be useful in the practice of the invention.

Such microfibers are hydrophobic and require the application of a minor proportion of non-irritating surfactant, such as Rohm and Haas Triton X-100 or Triton GR-5M, so that they will be suitably wettable by water for use in the towel material of the present invention. Since they are oleophylic, they wet easily with oleaginous liquids, such as oils, greases and solvents.

They may be formed into a low density web of high bulk by conventional vacuum web-forming processes and so may be deposited from a supply of bulk fibers to form outer layers 14 and 16 of composite towel material 10 or may be supplied in the roll form. However, since the web has little integrity, it is difficult to handle in roll form. Consequently, in order to provide such a web which may be easily handled in roll form, it may be desirable to treat the web with a suitable latex emulsion, which also enhances the abrasion resistance of outer layers 14 and 16, although such treatment may not be necessary under some circumstances. At the same time, the web may be treated with the necessary surfactant before winding it into roll form.

A suitable emulsion may include 20 percent relatively to the weight of dry microfiber web layer 14 and 16 of Rohm & Haas experimental acrylic 20 percent solids emulsion E-1285 for enhancing the abrasion resistance of the web, 0.5 percent of Rohm & Haas Triton GR-5M sulfo-succinate wetting agent for providing the necessary surfactant and 0.02 percent of Dow Corning H-10 silicone antifoam.

Inner absorbent layer 12 and 13 is preferably in the form of a mat of cellulose fibers, which is produced by disintegrating loosely held together bleached wood pulp, frequently referred to as "fluff", having a weight of about 60 grams/yard when laid down, for example. The "fluff" may contain about 5 to 30 percent, preferably about 13 percent, of a stabilizing thermoplastic powder which may thereafter be heated to about 180 degrees C to stabilize inner layer 12 and 13 in order to reduce its deterioration in use. As so stabilized, the cellulose fiber inner absorbent layer 12 and 13 may be supplied in roll form as "dry laid paper". Thus, inner absorbent layer 12 and 13 may be laid down either directly from a supply of "fluff" or, alternatively, as "dry laid paper" from a roll. Such "dry laid paper", having a weight of about 38 grams/yard, is available as #M-45 manufactured by the Edet Company of Holland.

Alternatively, stabilized soft wet-laid cellulose paper toweling material may be used.

For such stabilization, powders such as polyethylene with a low melting viscosity or a terpolymer of ethylene acrilic acid-acrylic acid ester, the latter being identified as TA 2957 of Plast Labor Co. of Bulle, Switzerland, may be used.

If desired, "super-absorbent" materials, such as PERMASORB 10 manufactured by National Starch may be incorporated into inner absorbent layer 12 and 13 to increase its water absorbency.

If used, reinforcing layer 20 may be any of a number of open, lightweight, woven or non-woven, fabric materials, such as 7 gram/square yard HE-443 Maralay latex bonded open fabric manufactured by The Kendall Company or 8 gram/square yard polypropylene spun bonded Lutrafil fabric manufactured by the Lutravil Company.

Figure 4:
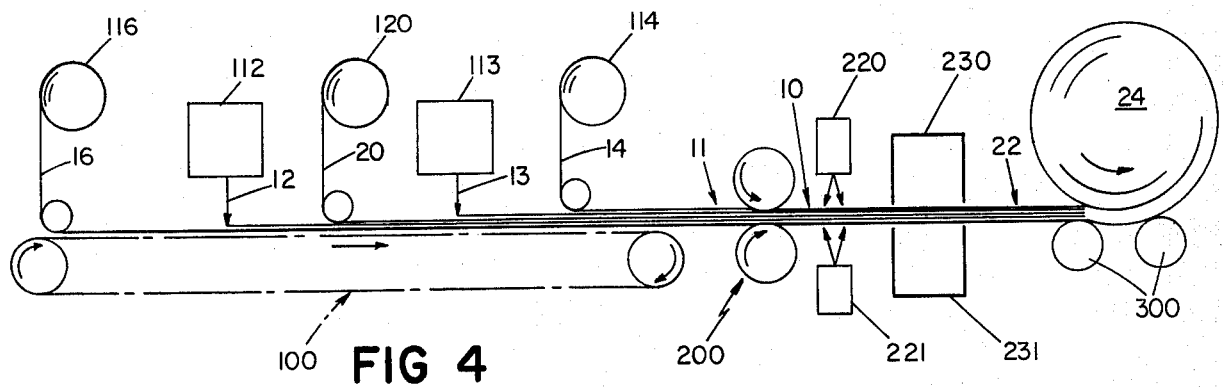
FIG. 4 is a schematic side view showing apparatus and methods of manufacture of the composite towel material of the invention.

Referring now to FIG. 4, the layers of the composite material of FIG. 3 of the invention may be assembled from two melt-blown fiber web rolls 116 and 114, two fluff suppliers 112 and 113 and a reinforcing material supplier 120 and deposited directly on conventional vacuum web forming apparatus 100 to provide an assembled but unbonded composite web 11 which is then moved directly to a conventional thermal or ultrasonic spot fusion bonding apparatus 200 to provide composite bonded absorbent sheet material 22.

The bonding of the layers of composite web 11 by discrete thermal spot fusion bonding, preferably by bonding apparatus such as that disclosed in U.S. Pat. Nos. 3,507,943 and 3,542,634, only in discrete bonded areas 18 or 19 which extend through inner layer 12 and 13 and reinforcing layer 20 and include both the thermoplastic material of inner layer 12 and 13 and the polyolefin material of outer layers 14 and 16, makes possible the provision of a novel absorbent hydrophilic and oleophilic multipurpose composite material of unusually low density and high void volume. Consistant with the requirements of material integrity, the total bonding area should be kept as low as possible to avoid unnecessary reduction in void volume, about 5 to a maximum of about 25 percent being preferred, although up to about 40 percent may be found to be desirable in some circumstances.

Under the high heat and pressure developed by bonding apparatus 200, the polyolefin microfibers of outer layers 14 and 16 in the bonded areas 18 and 19 lose their microfiber character and are usually melted into an opaque film including the thermoplastic powder of inner layer 12 and 13, if present, although a minor degree of aperturing may also occur. The cellulose material of inner layer 12 and 13 also develops a hydrogen bond, the so-called papermakers bond, under these conditions.

Any desired pattern may be used to enhance the appearance of the composite bonded material.

Other fusion spot bonding apparatus may also be used in the practice of the invention, such as, for example, an ultrasonic embossing Pinsonic bonding apparatus manufactured by the J. M. Hunter Machine Company.

In the event that the necessary surfactant treatment and any desired abrasion resistance treatment was not previously provided to the outer surfaces of outer layers 14 and 16 by earlier treatment, such may be accomplished by spraying onto the opposite surfaces of composite bonded material 22 a suitable surfactant and latex emulsion, such as that described above, by spray apparatus 220 and 221. Thereafter, composite material 22 may be heated by heaters 230 and 231 to dry the surfactant and to set the latex emulsion on the outer surfaces of outer layers 14 and 16.

In the event that the powder bonding material of inner layer 12 and 13, if used, was not previously heated to bond such layers, heaters 230 and 231 also serve to melt any remaining powder bonding material and so further bond inner layer 12 and 13.

The finished absorbent hydrophilic and oleophilic multipurpose composite towel material 22 of the invention may then be rolled up by conventional rollers 300 into a roll 24.

It will be apparent to those skilled in the art that various modifications, within the spirit of the invention and the scope of the appended claims, will be apparent to those skilled in the art.

What is claimed is:

1. An absorbent hydrophilic and oleophilic multipurpose composite towel material comprising:
   an inner hydrophilic absorbent layer of cellulosic material; and,
   outer layers of microfibrous polyolefin material on opposite sides of said inner layer;
   said outer layers being fusion bonded through said inner layer in discreet spot areas said spot bonded areas leaving the unbonded areas more than 60% of the whole and as large as possible consistant with requirements of material integrity, to produce a bonded composite material having low density and exceptionally high void volume for improved liquid absorbency.

2. The composite material of claim 1, further including a reinforcing layer positioned within said cellulosic material.

3. The composite material of claim 1 or 2, wherein:
   said spot bonding covers between 5 and 25% of the total surface area of said composite material.

4. The composite material of claim 1 wherein said outer surfaces are formed from a roll formed web treated with a latex emulsion to provide an abrasion resistant coating thereon facilitating fabrication.

5. The composite material of claim 1, wherein said cellulosic material contains between 5 and 30 percent of thermoplastic bonding in powder form.

6. An absorbent hydrophilic and oleophilic multipurpose composite towel material comprising:
   an inner hyrophilic absorbent layer of cellulosic material containing between about 5 to 30 percent of thermoplastic bonding powder therein
   a reinforcing layer of lightweight fabric material positioned within said cellulosic material
   outer layers of microfibrous polyolefin material composed of melt-blown microfibers having diameters in the range of about 2 to about 20 microns on opposite sides of said inner layer and said reinforcing layer,
   said composite towel material being fusion bonded in spot areas through said inner layer and said reinforcing layer to leave between 75 and 95% of the area of said towel material unbonded, to produce a bonded composite material having low density and exceptionally high void volume for improved liquid absorbency.

* * * * *